US011995749B2

(12) United States Patent
Borer et al.

(10) Patent No.: US 11,995,749 B2
(45) Date of Patent: May 28, 2024

(54) RIG-SPACE NEURAL RENDERING OF DIGITAL ASSETS

(71) Applicants: DISNEY ENTERPRISES, INC., Burbank, CA (US); ETH Zürich (Eidgenössische Technische Hochschule Zürich), Zürich (CH)

(72) Inventors: Dominik Borer, Zurich (CH); Jakob Buhmann, Zurich (CH); Martin Guay, Zurich (CH)

(73) Assignees: DISNEY ENTERPRISES, INC., Burbank, CA (US); ETH Zürich (Eidgenössische Technische Hochschule Zürich), Zürich (CH)

( * ) Notice: Subject to any disclaimer, the term of this patent is extended or adjusted under 35 U.S.C. 154(b) by 0 days.

(21) Appl. No.: 16/810,792

(22) Filed: Mar. 5, 2020

(65) Prior Publication Data
US 2021/0233300 A1    Jul. 29, 2021

Related U.S. Application Data

(60) Provisional application No. 62/965,163, filed on Jan. 23, 2020.

(51) Int. Cl.
  *G06T 13/40*    (2011.01)
  *G06N 20/00*    (2019.01)
(52) U.S. Cl.
  CPC ............. *G06T 13/40* (2013.01); *G06N 20/00* (2019.01)
(58) Field of Classification Search
  CPC ................................. G06T 13/40; G06N 20/00
  See application file for complete search history.

(56) References Cited

U.S. PATENT DOCUMENTS

| | | | |
|---|---|---|---|
| 10,262,448 B2* | 4/2019 | Bailey | G06T 7/20 |
| 2011/0052009 A1* | 3/2011 | Berkovich | G02B 27/01 |
| | | | 382/106 |
| 2011/0063415 A1* | 3/2011 | Gefen | H04N 21/4725 |
| | | | 348/43 |
| 2015/0206341 A1* | 7/2015 | Loper | G06T 17/10 |
| | | | 345/420 |
| 2017/0046563 A1* | 2/2017 | Kim | G06K 9/00275 |
| 2017/0249534 A1* | 8/2017 | Townsend | G06V 10/82 |
| 2017/0372505 A1* | 12/2017 | Bhat | G06T 19/20 |
| 2018/0181802 A1* | 6/2018 | Chen | G06N 3/0454 |

(Continued)

OTHER PUBLICATIONS

Aberman et al., "Deep Video-Based Performance Cloning", arXiv:cs. CV/1808.06847, https://doi.org/0000001.0000001_2, vol. 1, No. 1, Aug. 2018, p. :2-:10.

(Continued)

*Primary Examiner* — Yi Yang
(74) *Attorney, Agent, or Firm* — Squire Patton Boggs LLP; Sarah Mirza

(57) ABSTRACT

Various embodiments disclosed herein provide techniques for generating image data of a three-dimensional (3D) animatable asset. A rendering module executing on a computer system accesses a machine learning model that has been trained via first image data of the 3D animatable asset generated from first rig vector data. The rendering module receives second rig vector data. The rendering module generates, via the machine learning model, a second image data of the 3D animatable asset based on the second rig vector data.

21 Claims, 8 Drawing Sheets

(56) References Cited

U.S. PATENT DOCUMENTS

| | | | | |
|---|---|---|---|---|
| 2018/0293745 | A1* | 10/2018 | Ha | G06T 7/12 |
| 2019/0089942 | A1* | 3/2019 | Hanamoto | A63F 13/52 |
| 2020/0160546 | A1* | 5/2020 | Gu | H04N 5/23258 |

OTHER PUBLICATIONS

Buehler et al., "Unstructured Lumigraph Rendering", In Proceedings of the 28th Annual Conference on Computer Graphics and Interactive Techniques (SIGGRAPH '01), https://doi.org/10.1145/383259.383309, Aug. 12-17, 2001, pp. 425-432.

Carranza et al., "Free-Viewpoint Video of Human Actors", In ACM SIGGRAPH 2003 Papers (SIGGRAPH 03), https://doi.org/10.1145/1201775.882309, 2003, pp. 569-577.

Casas et al., "4D Video Textures for Interactive Character Appearance", Eurographics 2014, DOI: 10.1111/cgf.12296, vol. 33, No. 2, 2014, pp. 371-380.

Catmull, Edwin Earl, "A Subdivision Algorithm for Computer Display of Curved Surfaces", Ph.D. Dissertation, AAI7504786, 1974, 84 pages.

Chan et al., "Everybody Dance Now", arXiv:cs.GR/1808.07371, 2018, 12 pages.

Debevec et al., "Modeling and Rendering Architecture from Photographs: A hybrid geometry- and image-based approach", In Proceedings of the 23rd Annual Conference on Computer Graphics and Interactive Techniques (SIGGRAPH '96), https://doi.org/10.1145/237170.237191, 1996, pp. 11-20.

Eslami et al., "Neural scene representation and rendering", https://doi.org/10.1126/science.aar6170 arXiv:https://science.sciencemag.org/content/360/6394/1204.full.pdf, Science 360, Jun. 15, 2018, pp. 1204-1210.

Germann et al., "Articulated Billboards for Video-based Rendering", Eurographics 2010, Comput. Graph. Forum, vol. 29, No. 2, 2010, pp. 585-594.

Goodfellow et al., "Generative Adversarial Nets", In Advances in Neural Information Processing Systems 27, Z. Ghahramani, M. Welling, C. Cortes, N. D. Lawrence, and K. Q. Weinberger (Eds.). Curran Associates, Inc., http://papers.nips.cc/paper/5423-generative-adversarial-nets.pdf, arXiv:1406.2661, 2014, pp. 2672-2680.

Sola et al., "Image-to-Image Translation with Conditional Adversarial Networks", arXiv:1611.07004, 2016, 17 pages.

Johnson et al., "Perceptual Losses for Real-Time Style Transfer and Super-Resolution", In European Conference on Computer Vision, arXiv:1603.08155, 2016, pp. 1-18.

Karras et al., "Progressive Growing of Gans for Improved Quality, Stability, and Variation", CoRR abs/1710.10196, arXiv:1710.10196 http://arxiv.org/abs/1710.10196, 2018, pp. 1-26.

Levoy et al., "Light Field Rendering", In Proceedings of the 23rd Annual Conference on Computer Graphics and Interactive Techniques (SIGGRAPH'96), Association for Computing Machinery, https://doi.org/10.1145/237170.237199, 1996, pp. 31-42.

Liu et al., "Neural Rendering and Reenactment of Human Actor Videos", arXiv:arXiv:1809.03658, https://doi.org/10.475/123_4, vol. 1, No. 1, Article 282, May 2018, pp. 282:1-282:14.

Lombardi et al., "Neural Volumes: Learning Dynamic Renderable vols. from Images", CoRR abs/1906.07751, arXiv:1906.07751, https://doi.org/10.1145/3306346.3323020, ACM Trans. Graph., vol. 38, No. 4, Article 65, Jul. 2019, pp. 65:1-65:14.

Martin-Brualla et al., "LookinGood: Enhancing Performance Capture with Real-time Neural Re-Rendering", http://arxiv.org/abs/1811.05029, https://doi.org/10.1145/3272127.3275099, ACM Trans. Graph., vol. 37, No. 6, Article 255, Nov. 2018, pp. 255:1-255:14.

Meshry et al., "Neural Rerendering in the Wild", http://arxiv.org/abs/1904.04290, 2019, 16 pages.

Phong, Bui Tuong, "Illumination for Computer Generated Pictures", Communications ACM, https://doi.org/10.1145/360825.360839, vol. 18, No. 6, Jun. 1975, pp. 311-317.

Schodl et al., "Controlled Animation of Video Sprites", In Proceedings of the 2002 ACM SIGGRAPH/Eurographics Symposium on Computer Animation (SCA '02), Association for Computing Machinery, https://doi.org/10.1145/545261.545281, 2002, pp. 121-127.

Schodl et al., "Video Textures", In Proceedings of the 27th Annual Conference on Computer Graphics and Interactive Techniques (SIGGRAPH '00), ACM Press/Addison-Wesley Publishing Co., https://doi.org/10.1145/344779.345012, 2000, pp. 489-498.

Shysheya et al., "Textured Neural Avatars", arXiv:cs.CV/1905.08776, 2019, pp. 1-11.

Thies et al., "Deferred Neural Rendering:Image Synthesis using Neural Textures", arXiv:cs.CV/1904.12356, 2019, pp. 1-12.

Volino et al., "Optimal Representation of Multiple-View Video", In Proceedings of the British Machine Vision Conference, BMVA Press, http://dx.doi.org/10.5244/C.28.8, Sep. 2014, pp. 1-12.

Xu et al., "Video-based Characters—Creating New Human Performances from a Multi-view Video Database", In ACM SIGGRAPH 2011 Papers (SIGGRAPH '11), https://doi.org/10.1145/1964921.1964927, ACM Transactions on Graphics, vol. 30, No. 4, Article 32, Jul. 2011, pp. 32:1-32:10.

* cited by examiner

RIG-SPACE NEURAL RENDERING OF DIGITAL ASSETS

CROSS-REFERENCE TO RELATED APPLICATIONS

This application claims priority benefit of the United States Provisional Patent Application titled, "RIG-SPACE NEURAL RENDERING OF DIGITAL ASSETS," filed on Jan. 23, 2020 and having Ser. No. 62/965,163. The subject matter of this related application is hereby incorporated herein by reference.

BACKGROUND

Field of the Various Embodiments

The various embodiments relate generally to computer-based animation and, more specifically, to rig-space neural rendering of digital assets.

Description of the Related Art

Oftentimes, animated and live-action movie productions for feature films, short subjects, and/or the like employ computer-based animation and/or computer-generated imagery (CGI). Typically, such movie productions are intended to be displayed on large-format displays, such as cinema screens. Accordingly, movie production professionals create high resolution three-dimensional (3D) characters and other synthetic 3D objects to generate high quality images capable of being projected onto such large displays. Such 3D characters and 3D objects are referred to herein as "3D assets." These high-resolution 3D assets are animated by means of complex proprietary rigs, where a rig provides structure to the 3D asset that enable the 3D asset to move. Computer animators manipulate the rig to cause the 3D asset to move, using a process known as "deformation." Surface geometry defines the look of the 3D asset. As the rig moves, the surface geometry moves correspondingly, resulting in a lifelike 3D asset that can move and interact with other assets in the movie production. Due to the complexity of high-resolution 3D assets developed for movie productions, these 3D assets are typically not animated in real-time. For example, each second of animation for a 3D asset may include 24 or more still frames, where each still frame may take minutes or hours to generate. This process is referred to herein as "offline" production.

The 3D assets developed for movie productions are often repurposed for other applications. For example, the movie production team may want to generate previsualizations (also referred to herein as "previs") to quickly generate a preview of what a scene for the current movie production or a sequel production may look like. The movie production team may want to generate a computer game that includes 3D characters and other 3D assets developed from the movie production. The movie production team may want to generate an extended reality (XR) experience where users can interact with the 3D characters and other 3D assets from a movie production and have the experience of being in the movie. Such an XR experience may be a virtual reality (VR) experience where all characters and assets seen by the user are computer-generated. Additionally or alternatively, such an XR experience may be an augmented reality (AR) experience, where the user views characters and other assets in combination with assets in the physical world.

These additional applications typically manipulate the 3D assets in real-time so that each second of movement of the 3D assets is generated in approximately one second. This process is referred to herein as "real-time" production. With real-time production, a user is able to enjoy an immersive experience, where the user dynamically interacts with the 3D assets via a previs, computer-game, or XR experience. In order to manipulate the 3D assets in real-time, the movie production team, or another production team, generates a low-resolution proxy of the 3D asset with a simpler rig, simpler surface geometry, and more basic deformation algorithms. For example, a high-resolution 3D asset developed for cinema productions may include a rig with hundreds or thousands of manipulation points (referred to herein as "control points") and may include millions of polygons of surface geometry. The high-resolution 3D asset may be associated with complex, proprietary deformation algorithms that allow the 3D asset to move in a unique way, thereby giving nuance and uniqueness to the manner in which the 3D asset moves. By contrast, a low-resolution version of the 3D asset may include a rig with dozens of control points and may include about a hundred-thousand polygons. The high-resolution 3D asset may be associated with more simple, generic deformation algorithms that allow the 3D asset to move in real-time.

One drawback with the above approach for developing 3D assets is that computer application software for generating high-resolution 3D assets for the cinema are generally incompatible with the computer application software for generating low-resolution 3D assets for real-time applications. Therefore, the low-resolution 3D asset cannot be derived from the high-resolution 3D asset. Instead, the low-resolution 3D asset is typically developed from scratch, including a new rig, new surface geometry, and new deformation algorithms. This process typically includes multiple artistic approval cycles to ensure that the low-resolution 3D asset is an acceptable proxy of the original high-resolution 3D asset. As a result, several weeks or months are needed to generate the low-resolution 3D asset, leading to lower productivity and higher expenses. Another drawback with the above approach is that the low-resolution 3D asset necessarily has fewer details, less-refined textures, and simpler, less-nuanced movements relative to the original high-resolution 3D asset. As a result, the initial artistic intent of the 3D asset may be lost to some degree, leading to a less realistic user experience.

As the foregoing illustrates, what is needed in the art are more effective techniques for animating 3D assets for various offline and real-time applications.

SUMMARY

Various embodiments disclosed herein provide a computer-implemented method for generating image data of a three-dimensional (3D) animatable asset. The method includes accessing a machine learning model that has been trained via first image data of the 3D animatable asset generated from first rig vector data. The method further includes receiving second rig vector data. The method further includes generating, via the machine learning model, a second image data of the 3D animatable asset based on the second rig vector data.

Other embodiments include, without limitation, one or more non-transitory computer-readable media storing instructions for performing one or more aspects of the disclosed techniques, as well as a system for performing one or more aspects of the disclosed techniques.

At least one technical advantage of the disclosed techniques relative to the prior art is that the disclosed techniques enable a computer-based machine learning model to generate image data directly from an animation rig in real-time. Because the training image data for the machine learning model is based on the original animation rig, deformation algorithms, and surface geometry, the real-time image data generated by the machine learning model is more realistic and true to the original 3D asset relative to prior real-time rendering techniques. Another technical advantage of the disclosed techniques is that, because surface normal image data, depth image data, and mask image data are generated via a single combined branch of the machine learning model, the machine learning model is smaller and more efficient than machine learning models that process such image data via three separate branches. As a result, the machine learning model consumes less computer resources relative to prior approaches. These technical advantages represent one or more technological advancements over prior art approaches.

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the present disclosure may admit to other equally effective embodiments.

DETAILED DESCRIPTION

In the following description, numerous specific details are set forth to provide a more thorough understanding of the embodiments of the present disclosure. However, it will be apparent to one of skill in the art that the embodiments of the present disclosure may be practiced without one or more of these specific details.

As further described herein, a rendering module executing on a computer system generates image-based data in real-time directly from rig vector data associated with an animation rig of a 3D animated character or other 3D asset. The animation rig may include a kinematic skeleton, blend shapes, coarse mesh vertices, surface parameterization, and/or the like. The rendering module generates training data for a machine learning model by rendering the 3D asset from the original animation rig, deformation algorithms, and surface geometry. The rendering module renders the 3D asset in various poses and at different views from a virtual camera. The rendering module stores the rig vector data along with the corresponding image data of the rendered 3D asset as a training data set for a machine learning model.

The stored rig vector data and image data is then employed to train a progressive multi-branch generative machine learning model to render image data directly from animation rig data. The machine learning model may generate image data that is properly lit and ready to be composed with other 3D assets such as 3D objects and other scene elements to generate a final composited scene. Alternatively, the machine learning model may generate separate image data for albedo, surface normal, depth, and/or mask. As a result, the rendering module may dynamically modify lighting sources that affect the look of the 3D asset in a more flexible and realistic manner. The depth image data and mask data enable the rendering module to composite the 3D asset with other 3D assets such as 3D objects and other scene elements.

At run time, the rendering module manipulates the rig parameters, in the form of rig vector data, based on motion capture data, rig control data, and/or the like. The rendering module transmits the rig vector data to the trained machine learning model to generate high-quality image data for the 3D asset in real-time. The rendering module then employs the image data to add lighting to the 3D asset and composite the 3D asset with other 3D assets such as 3D objects and other scene elements to generate a final composited scene.

In the following description and in the attached appendices, numerous specific details are set forth to provide a more thorough understanding of the present disclosure. However, it will be apparent to one of skill in the art that embodiments of the present disclosure may be practiced without one or more of these specific details.

System Overview

Figure 1:
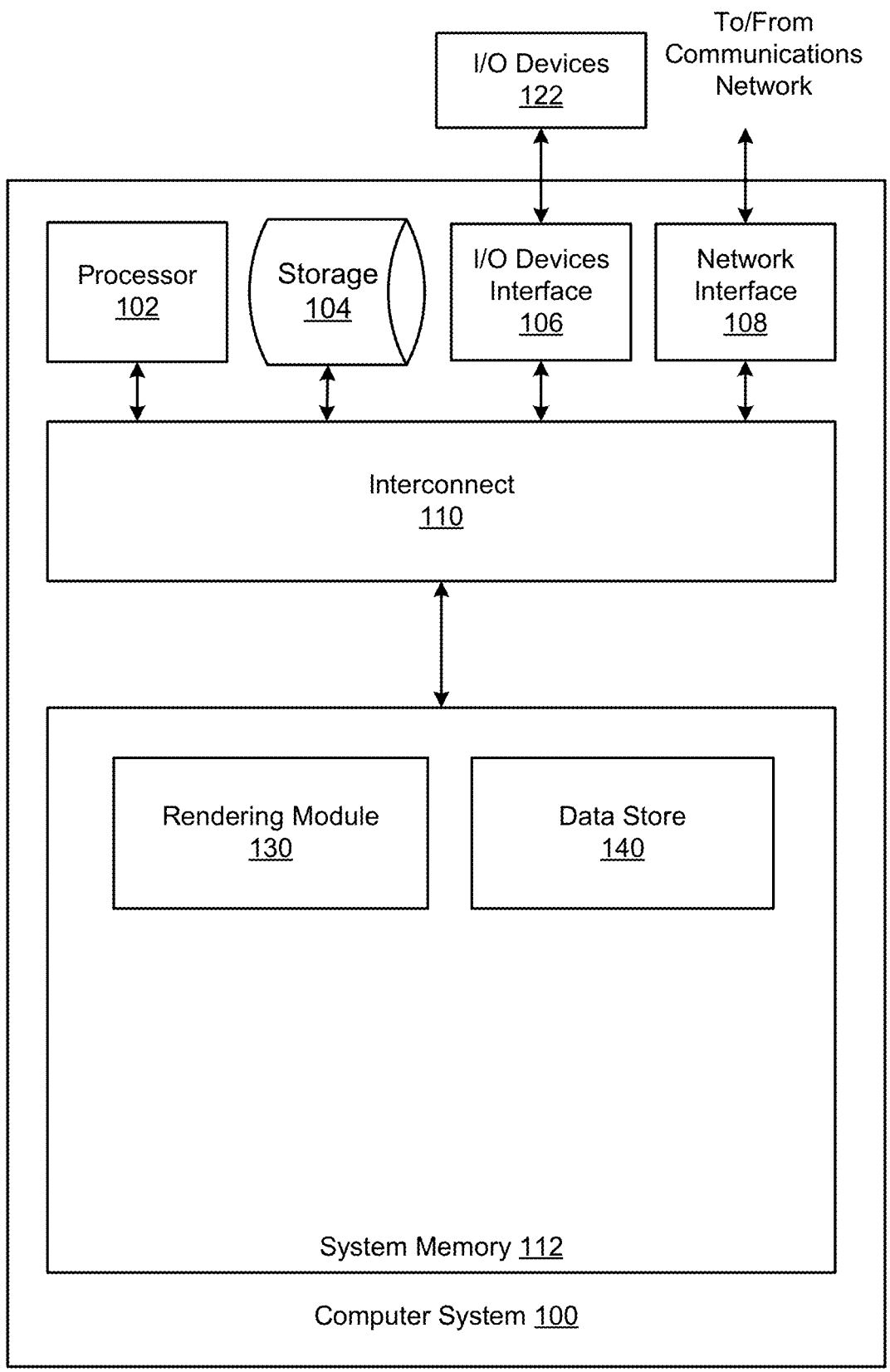
FIG. 1 illustrates a computer system configured to implement one or more aspects of the present disclosure.

FIG. 1 illustrates a computer system 100 configured to implement one or more aspects of the present disclosure. As shown, computer system 100 includes, without limitation, a processor 102, storage 104, an input/output (I/O) devices interface 106, a network interface 108, an interconnect 110, and a system memory 112.

The processor 102 retrieves and executes programming instructions stored in the system memory 112. Similarly, the processor 102 stores and retrieves application data residing in the system memory 112. The interconnect 110 facilitates transmission, such as of programming instructions and application data, between the processor 102, input/output (I/O) devices interface 106, storage 104, network interface 108, and system memory 112. The I/O devices interface 106 is configured to receive input data from user I/O devices 122. Examples of user I/O devices 122 may include one of more buttons, a keyboard, and a mouse or other pointing device. The I/O devices interface 106 may also include an audio output unit configured to generate an electrical audio output signal, and user I/O devices 122 may further include a speaker configured to generate an acoustic output in response to the electrical audio output signal. Another example of a user I/O device 122 is a display device that generally represents any technically feasible means for generating an image for display. For example, the display device could be a liquid crystal display (LCD) display, organic light-emitting diode (OLED) display, digital light processing (DLP) display, and/or the like. The display device may be a TV that includes a broadcast or cable tuner for receiving digital or analog television signals. The display device may be included in a VR/AR headset. Further, the display device may project an image onto one or more surfaces, such as walls or projection screens.

Processor 102 is included to be representative of a single central processing unit (CPU), multiple CPUs, a single CPU having multiple processing cores, digital signal processors (DSPs), field-programmable gate arrays (FPGAs), graphics processing units (GPUs), tensor processing units (TPUs), and/or the like. And the system memory 112 is generally included to be representative of a random access memory. The storage 104 may be a disk drive storage device. Although shown as a single unit, the storage 104 may be a combination of fixed and/or removable storage devices, such as fixed disc drives, floppy disc drives, tape drives, removable memory cards, or optical storage, network attached storage (NAS), a storage area-network (SAN), and/or the like. Processor 102 communicates to other computing devices and systems via network interface 108, where network interface 108 is configured to transmit and receive data via a communications network.

The system memory 112 includes, without limitation, a rendering module 130 and a data store 140. Rendering module 130 performs one or more operations, as further described herein. Rendering module 130 stores data in and retrieves data from data store 140, as further described herein. In some embodiments, rendering module 130 may include and/or use one or more machine learning models that further include neural networks, machine learning elements, and/or the like. In some embodiments, rendering module 130 is executed by processor 102.

In operation, rendering module 130 employs a machine learning model to generate image data for a 3D asset from rig vector data. In so doing, rendering module 130 performs four steps: 1) receiving a training data set; 2) training the machine learning model using the training data set; and 3) generating real-time image data from rig vector data and the machine learning model; and 4) compositing the 3D asset with other 3D assets such as 3D objects and other scene elements into a final composited scene.

In a first step, rendering module 130 deforms the animation rig via the original deformation algorithms for the 3D asset in order to manipulate the 3D asset into a particular pose. In some embodiments, the animation rig is in the form of a kinematic skeleton defined as positions and orientations of various joints of the kinematic skeleton. In some embodiments, the animation rig is in an alternative form, such as vertex-based elements, blend shapes, and/or the like.

Rendering module 130 renders the 3D asset via the surface geometry of the 3D asset to generate a full high-resolution image of the 3D asset. Rendering module 130 performs this operation on the 3D asset for various poses of the animation rig and for various virtual camera views. More specifically, rendering module 130 retrieves a 3D model of the 3D asset along with a pose dataset defined in rig parameter q space. Rendering module renders each pose with many different camera views c. In order to avoid redundant pose information, rendering module 130 transforms rig parameters q into camera space according to the equation $\tilde{q}=c^{-1}q$, where $\tilde{q}$ includes character position and orientation resulting from both the pose of the animation rig and the virtual camera view.

After rendering the 3D asset at various rig poses and virtual camera views, rendering module 130 stores the rig vector data and corresponding image data as a training data set for a machine learning model.

In a second step, rendering module 130 trains the machine learning model via the training data set. The machine learning model receives pose and view rig vector data in $\tilde{q}$ space. From the rig vector data, the machine learning model generates image data in the form of feature maps. In particular, the machine learning model generates image data $I=\{I_a, I_n, I_d, I_m\}$, where $I_a$ is albedo image data, $I_n$ is surface normal image data, $I_d$ is depth image data, and $I_m$ is mask image data.

In some embodiments, the machine learning model may generate multiple sets of image data from a single branch of the model. For example, the machine learning model may have a first branch for generating albedo image data $I_a$ and a second branch that is shared for generating surface normal image data $I_n$, depth image data $I_d$, and mask image data $I_m$. More specifically, in order to provide for dynamic lighting of the 3D asset, as well as dynamic composition of the 3D asset with other 3D assets such as 3D objects and other scene elements, the machine learning model generates all four elements of the image data in real-time. Separately training four branches of the machine learning model for the four elements of the image data may significantly increases training time, and may be overly burdensome on memory and processor resources.

Because surface normal image data $I_n$, depth image data $I_d$, and mask image data $I_m$, are similar by nature, these three elements may be efficiently encoded in a common branch of the machine learning model. For example, surface normal, depth, and mask data are correlated and may be computed from one another. Surface normal data may be computed from depth data by computing gradients, mask data may be computed via a simple binary test from either depth data or surface normal data, and so on. Therefore, the machine learning model may share a single branch up to a certain resolution, such as 8×8, and then branch into two branches, one branch for albedo data and another branch for surface normal, depth, and mask data.

In some embodiments, the original animation rig may have too many control points for the machine learning model to generate image data in real-time. In these embodiments, rendering module 130 parameterizes the kinematic skeleton or other form of animation rig. As a result, rendering module 130 generates a parameterized animation rig with fewer control points than the original animation rig. At run time, rendering module 130 generates parameterized rig vector data suitable for the parameterized animation rig. The machine learning model may then generate image data in real-time from the parameterized animation rig.

In some embodiments, training the entire machine learning model as a single unit may result in the failure of the machine learning model to converge when training with certain high-resolution images. In one example, if training the entire model machine learning model up to full resolution fails to converge, the resulting image data may exhibit significant undesirable artefacts, such as a 3D character with missing limbs and/or large holes. Consequently, rendering module 130 trains the machine model progressively in a layer-by-layer approach. As further described herein, the machine learning model first maps the rig parameters $\tilde{q}$ to a fixed sized feature vector using fully connected machine learning layers. Then, the machine learning model increase the spatial resolution of the feature maps quadratically using multiple convolutional blocks, where each convolutional block doubles the spatial resolution of the image. In one example, the machine learning model successfully converges where the machine learning model first trains via multiple layers to a spatial resolution of 16×16 pixels, and then trains separately for each layer that doubles the spatial resolution to 32×32 pixels, 64×64 pixels, and so on until the final resolution is achieved.

In a third step, at run time, rendering module 130 receives rig parameters $\tilde{q}$ from a motion capture system, a rig control system, a gaming application, an XR application, and/or the like. Rendering module 130 transmits the rig parameters $\tilde{q}$ to the machine learning model in real-time. The trained machine learning model, in turn, generates image data of the 3D asset in real-time based on the pose and view represented by the rig parameters $\tilde{q}$. The generated image data may then be dynamically lit and composited into a final composited scene.

In some embodiments, the trained machine learning model generates a fully lit 3D asset based in the light model of the 3D asset when the machine learning model was trained. Image data generated in this manner may only be composited into a final composited scene that has the same light model as the 3D asset. In some embodiments, the trained machine learning model generates image data I={I.sub.a, I.sub.m, I.sub.d, I.sub.m} with separate elements for albedo, surface normal, depth, and mask data. By generating such separate elements, the rendering module 130 may more easily and accurately generate the 3D asset in a scene with dynamically changing light sources. Further, the rendering module 130 may more easily and accurately composite the 3D asset in a scene with other dynamically moving 3D objects.

In a fourth step, rendering module 130 composites a scene that includes the 3D asset. In order to move the 3D asset within the scene, rendering module 130 transforms, or warps, the feature maps of the image data so as to appear positioned at new locations in the scene. To create the appearance of being rendered at new positions, rendering module 130 effectively treats the 3D asset as a 3D billboard moving with the root motion of the 3D asset while facing the camera. This technique automatically takes into account the image-space scale of the 3D asset.

In some embodiments, the machine learning model is trained with poses centered within the virtual camera view. Therefore, rendering module 130 performs additional computations if the view of the 3D asset within the scene is off-center with respect to the virtual camera view. For off-center viewing, rendering module 130 compute the rotation R between a ray passing through the center point of the virtual camera, and the ray passing through the center point of the 3D asset as displaced in the scene. Rendering module 130 applies this rotation R to the pose $\tilde{q}$, resulting in a new pose $\hat{q}$–R$\tilde{q}$. Rendering module 130 transmits the new pose $\hat{q}$ to the machine learning mode to generate corresponding image data $\hat{I}$ in camera space:

In some embodiments, in order to scale the depth data, rendering module 130 computes the scale s between the image-space 3D asset dimensions at run-time and the image-space 3D asset dimensions at training time. Rendering module 130 then scale the depth values of $\hat{I}_d$ with the inverse of the scale s in order to increase depth as the billboard gets smaller, resulting in a new depth map $\tilde{I}_d = s^{-1}\hat{I}_d$. Rendering module 130 employs the adjusted image data in image space. Accordingly, rendering module may perform additional pixel-wise operations to compute light intensity using the surface normal data $\hat{I}_n$, and compose the 3D asset with other 3D objects using depth maps $\tilde{I}_d$.

Rendering module 130 may generate dynamic lighting effects for the 3D asset by using the surface normal data and composing the surface normal data with light sources in the scene by computing Phong shading data. For each virtual camera, rendering module sums the dot product between the light source pointing direction and the normal vector.

Rendering module 130 may composite the 3D asset with other 3D assets such as 3D objects and other scene elements. When other 3D objects move in front of the 3D asset, rendering module determines which pixels of the 3D asset are to be replaced by the color from pixels of the occluding 3D object. Rendering module 130 may make this determination via a depth buffer. The depth image data of the 3D asset may be compared with depth information of other 3D objects to determine which 3D object or 3D objects contributed to the final color for each pixel in the final composited scene.

Further details of rendering module 130 and the machine learning model are now described.

Figure 2:
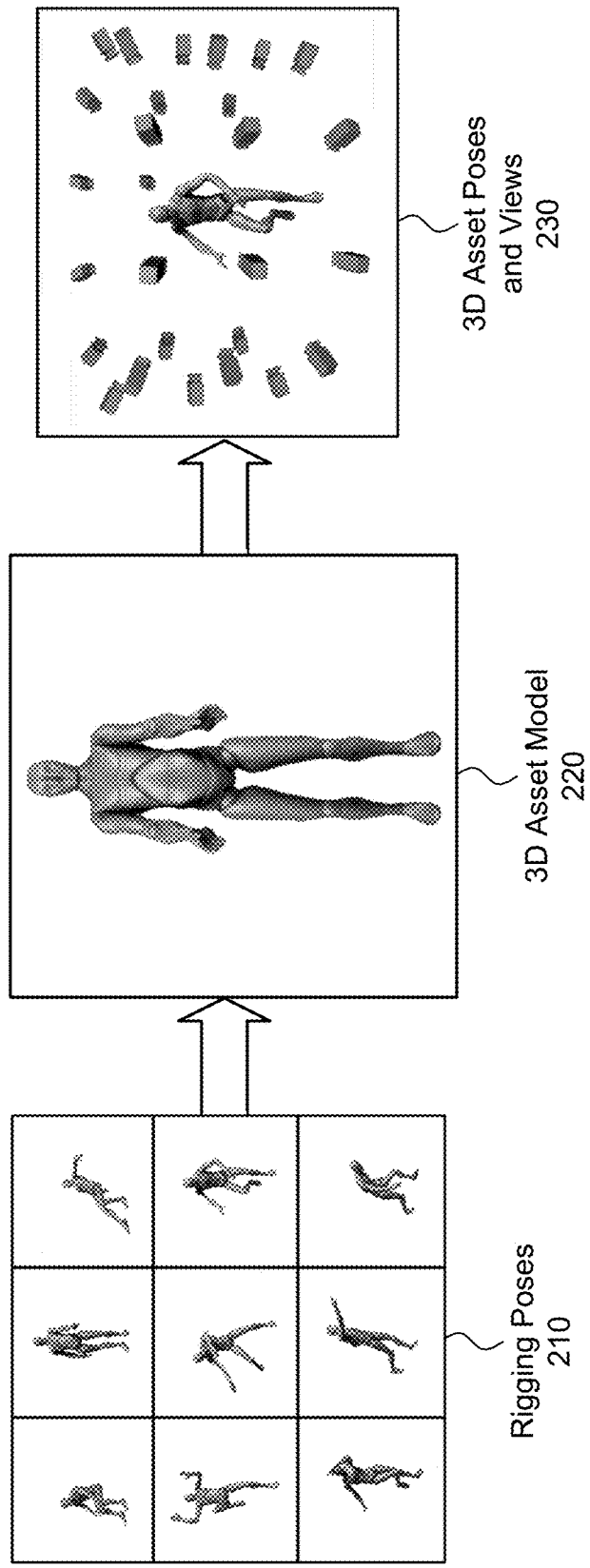
FIG. 2 illustrates how image data is generated for training the computer system of FIG. 1, according to various embodiments.

FIG. 2 illustrates how image data is generated for training the computer system 100 of FIG. 1, according to various embodiments. As shown, rendering module 130 generates various rigging poses 210 by deforming the animation rig of a 3D asset according to various deformation techniques. The animation rig may include a skeletal structure with movable joints, a surface parameterization, blend shades, and/or the like. The rigging poses 210 may represent various activities being performed by the 3D asset, such as sitting, dancing, reaching, standing up, and/or the like. Rendering module 130 applies the rigging poses 210 to a 3D asset model 220. The 3D asset model includes the surface geometry of the 3D asset, including shape, color, reflectivity, and texture of the surface of the 3D asset. The surface geometry may include a polygon mesh, a parametric curved surface, a set of volumetric pixels (voxels), and/or the like.

After rendering module 130 applies the rigging poses 210 to the 3D asset model 220, the surface geometry of the 3D asset model 220 changes to match the corresponding rigging pose 210. Rendering module 130 modifies a position and/or orientation of a virtual camera to view the 3D asset model 220 from various angles and positions. Additionally or alternatively, rendering module 130 rotates the 3D asset model 220 in 3D space while keeping the virtual camera in the same position and orientation. Rendering module 130 repeats this process for various rigging poses 210 to generate 3D asset poses and views 230. Rendering module 130 stores the image data associated with the 3D asset poses and views 230 along with the corresponding rig vector data associated with the rigging poses 210 to generate a training data set for the machine learning model.

Figure 3:
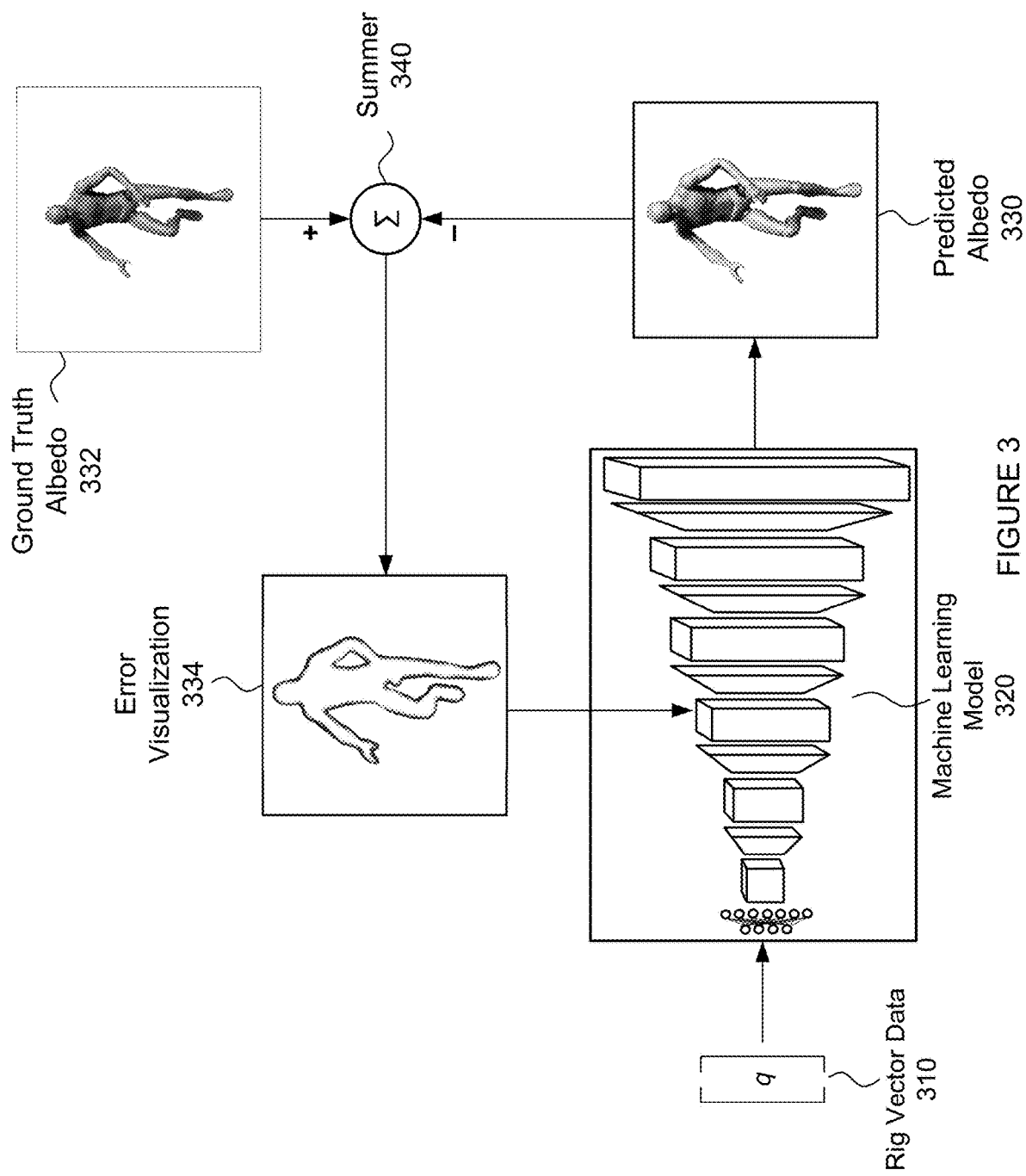
FIG. 3 illustrates a training process for the machine learning model implemented by the computer system of FIG. 1, according to various embodiments.

FIG. 3 illustrates a training process for the machine learning model implemented by the computer system 100 of FIG. 1, according to various embodiments. As shown, rendering module 130 retrieves rig vector data 310 for a particular pose and view from the training data set. Rendering module 130 transmits the rig vector data 310 to a machine learning model 320. Machine learning model 320 may include one or more neural networks and/or other machine learning elements. Machine learning model 320 generates a predicted albedo 330 at a particular resolution. A summer 340 compares the predicted albedo 330 with the ground truth albedo 332 stored in the training data set. The summer performs the comparison via any technically feasible technique, such as by subtracting the predicted albedo 330 image data from the ground truth albedo 332 image data, a suitable loss model, and/or the like. The summer 340 thereby generates an error visualization 334 based on the comparison. The error visualization 334 image data is fed back into machine learning model 320 to further train machine learning model 320, such as by using back propagation. Over time, as machine learning model 320 continues to train on the poses and views included in the training data set, the predicted albedo 330 image data from machine learning model 320 converges to more closely approximate the ground truth albedo 332 image data. As a result, the quality of the image generated by machine learning model 320 continues to improve. Correspondingly, the error visualization 334 reflects less of a difference between the predicted albedo 330 image data and the ground truth albedo 332 image data.

Rendering module 130 repeats the above process for various other rig vector data 310 and ground truth albedo 332 image data stored in the training data set. In various embodiments, rendering module 130 further performs the above process for one or more of surface normal image data, depth image data, and mask image data.

Figure 4:
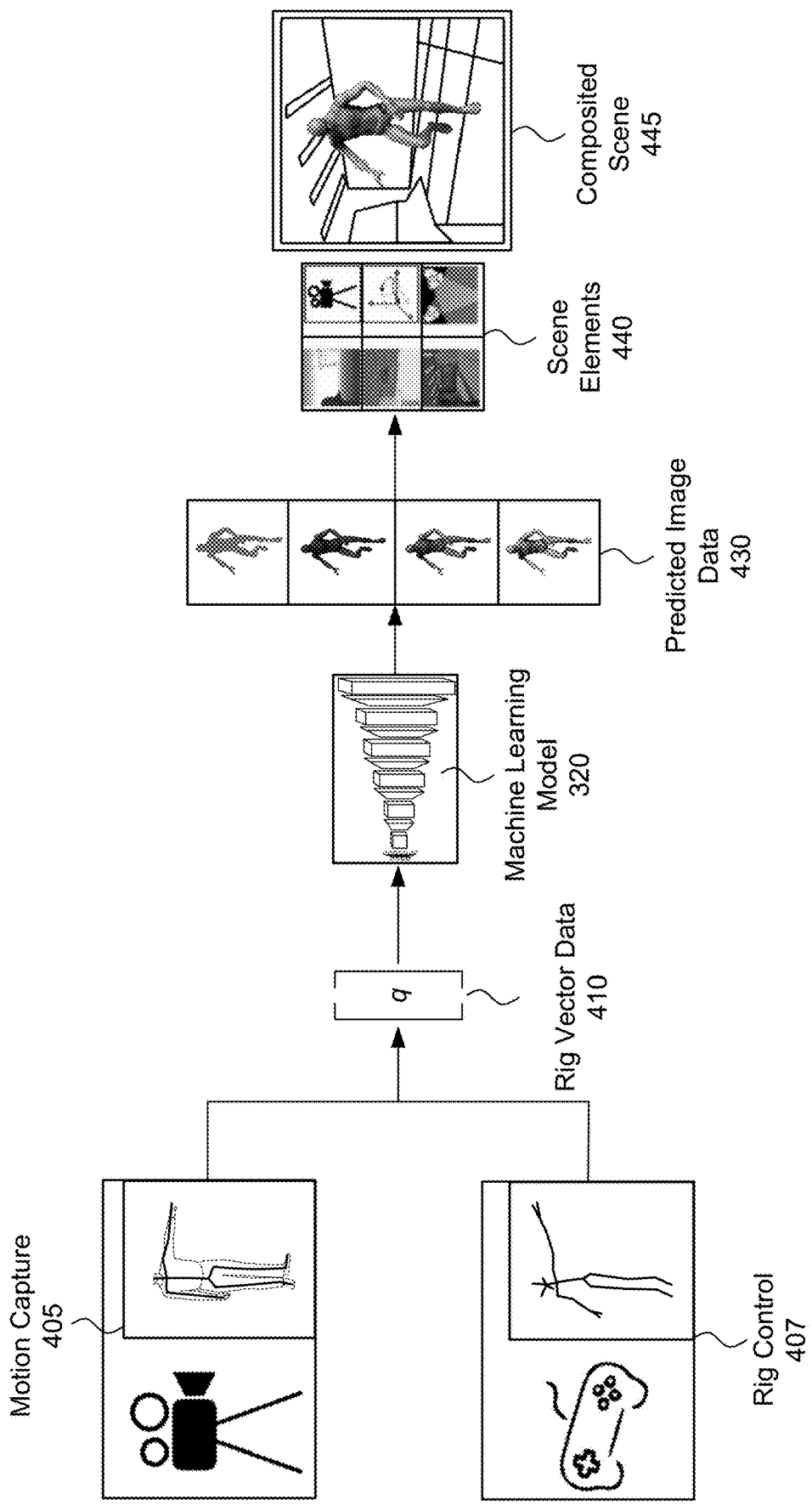
FIG. 4 illustrates how image data is generated in real-time by the computer system of FIG. 1, according to various embodiments.

FIG. 4 illustrates how image data is generated in real-time by the computer system 100 of FIG. 1, according to various embodiments. As shown, rendering module 130 generates rig vector data 410 at run time from a motion capture 405 system, a rig control 407 system, a gaming application, an XR application, and/or the like. With a motion capture 405 system, a live actor is fitted with sensors that represent the movable joint positions of the animation rig. As the actor moves, motion capture 405 system tracks the movement of the sensors and transmits the position and/or orientation of the sensors to rendering module 130. Rendering module 130 converts the sensor position and orientation data into rig vector data 410. With a rig control 407 system, a user manipulates the animation rig via a hardware controller, a software user interface, and/or the like. As the user manipulates the animation rig, rig control 407 system generates corresponding position and orientation data for various movable joint positions of the animation rig. Rig control 407 system transmits the position and/or orientation of the sensors to rendering module 130. Rendering module 130 converts the sensor position and orientation data into rig vector data 410. With a gaming application, a user interacts with a game controller, a data glove, and/or other input device to manipulate a character that appears in the gaming application. Rendering module 130 converts data transmitted by the input device into rig vector data 410. With an XR application, a user interacts with an extended reality environment, such as a VR environment or AR environment, with an XR headset, a mobile XR display, and/or other XR device. The user may be represented by an avatar that appears in the XR environment. The user manipulates the avatar via the XR device. Rendering module 130 converts data transmitted by the XR device into rig vector data 410.

Rendering module 130 transmits the rig vector data 410 to machine learning model 320. Machine learning model 320 generates predicted image data 430 based on the received rig vector data 410. The predicted image data 430 may include one or more of albedo image data, surface normal image data, depth image data, and/or mask image data. Based on the predicted image data 430, rendering module 130 composites the 3D asset with the particular pose and view with other scene elements 440 to generate a final composited scene 445.

Figure 5:
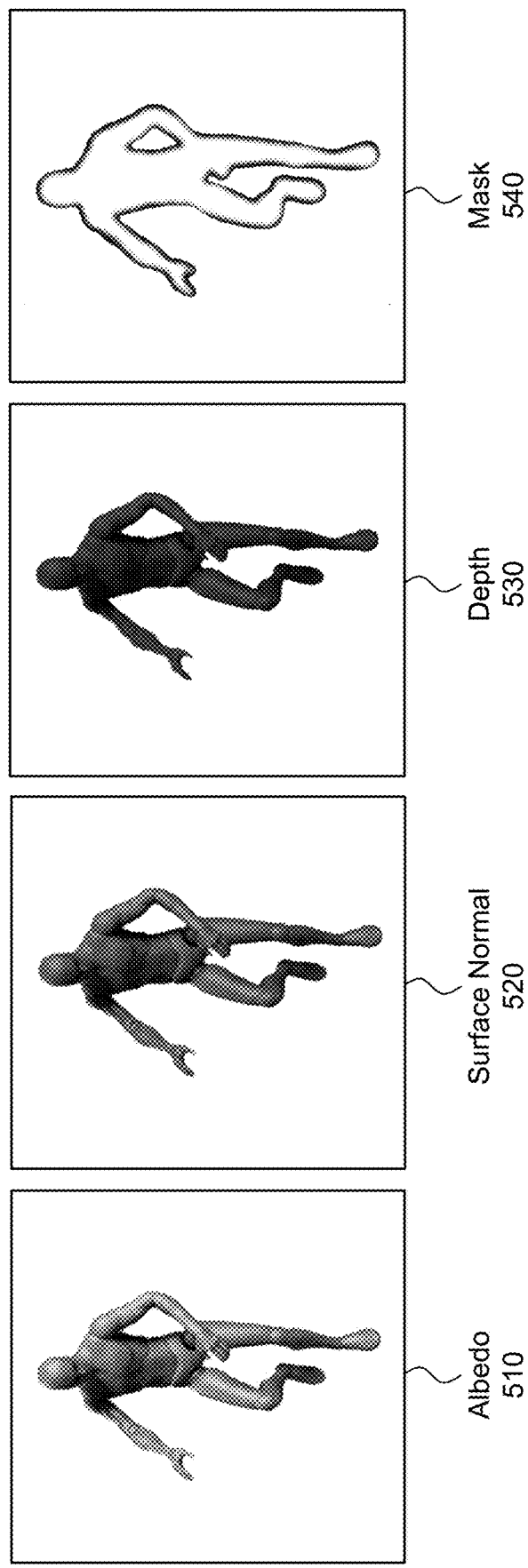
FIG. 5 illustrates a set of image data generated by the computer system of FIG. 1, according to various embodiments.

FIG. 5 illustrates a set of image data generated by the computer system 100 of FIG. 1, according to various embodiments. As shown, machine learning model 320 generates predicted image data 430 based on the received rig vector data 410. The predicted image data 430 may include one or more of albedo 510 image data, surface normal 520 image data, depth 530 image data, and mask 540 image data. Albedo 510 image data defines the surface appearance of the 3D asset at each pixel of the image, including the color and texture of the surface of the 3D asset. Surface normal 520 image data defines the direction that is perpendicular to the surface of the 3D asset at each pixel of the image. Depth 530 image data defines the distance between the virtual camera and the surface of the 3D asset at each pixel of the image. Mask 540 image data defines the opacity of the surface of the 3D asset at each pixel of the image. A particular pixel of the image of the 3D asset may be fully opaque, indicating that only the 3D asset may be seen at that pixel. Additionally or alternatively, a particular pixel of the image of the 3D asset may be fully transparent, indicating that only the background behind the 3D asset may be seen at that pixel. Additionally or alternatively, a particular pixel of the image of the 3D asset may be partially transparent, indicating that a blend of 3D asset and the background behind the 3D asset may be seen at that pixel. Rendering module 130 employs one or more of albedo 510 image data, surface normal 520 image data, depth 530 image data, and mask 540 image data to composite composites the 3D asset with the particular pose and view with other scene elements 440 to generate a final composited scene 445.

Figure 6:
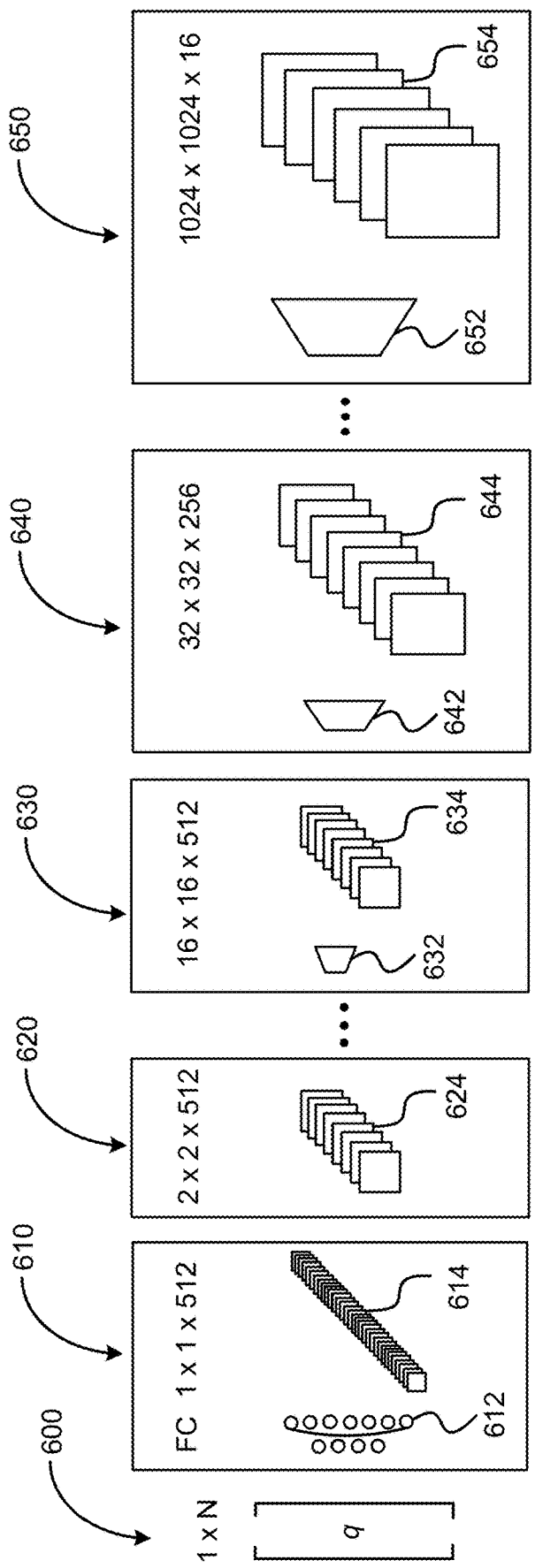
FIG. 6 illustrates a machine learning model employed by the computer system of FIG. 1, according to various embodiments.

FIG. 6 illustrates a machine learning model 320 employed by the computer system 100 of FIG. 1, according to various embodiments. As shown, machine learning model 320 receives rig vector data 600 as a one-dimensional 1×N array, where N represents the number of control points in the animation rig. Each control point is defined by rig parameters q, where q may include 3D positional x, y, z data and/or orientation data. The positional and/or orientation data may be in the form of quaternions, rotation matrices, angles, and/or any other technically feasible rig parameters. In one example, the rig parameters may include both positional data and orientation data. In another example, the rig parameters may include only positional data. In yet another example, the rig parameters may include only orientation data. In any case, the resulting rig parameters q are concatenated together to form a vector of real values. Taken together, rig vector data 600 includes rig parameters for all control points included in the animation rig. Rig vector data 600 includes position and/or orientation of the animation rig after being deformed along with the virtual camera position and orientation. When applied to a 3D asset, rig vector data 600 deforms the animation rig to a particular pose when viewed by virtual camera at a particular position and orientation.

Rig vector data 600 is transmitted to a first layer 610 of machine learning model 320. The first layer 610 includes a fully connected block 612 and a set of 1×1×512 feature maps 614. The fully connected block 612 receives rig vector data 600 and maps the rig vector data 600 to feature maps 614, where feature maps 614 include 512 feature maps at a resolution of 1 pixel×1 pixel. The 512 feature maps 614 may be blended to form a 1 pixel×1 pixel image of the 3D asset (not shown).

Images from the feature maps 614 are transmitted to and processed by layer 620 which includes fully connected 2×2×512 feature maps 624. Layer 620 receives image data from feature maps 614 and maps the image data represented by feature maps 614 to feature maps 624. This process continues through additional layers (not shown) which include fully connected 4×4 and 8×8 feature maps. The fully connected 8×8 feature maps are then transmitted to layer 630. Layer 630 includes a convolution block 632 and a set of 16×16×512 feature maps 634. The convolution block 632 receives image data from the fully connected 8×8 feature maps and maps the image data represented by the 8×8 feature maps to feature maps 624, where the feature maps 634 include 512 feature maps at a resolution of 16 pixels×16 pixels. The 512 feature maps 634 may be blended to form a 16 pixel×16 pixel image of the 3D asset (not shown).

Similarly, images from the feature maps 634 are transmitted to layer 640 which includes a convolution block 642 and a set of 32×32×256 feature maps 644. The convolution block 642 receives image data from feature maps 634 and maps the image data to represented by feature maps 634 to feature maps 644, where the feature maps 644 include 256 feature maps at a resolution of 32 pixels×32 pixels. This process continues through additional layers (not shown) of convolution blocks and feature maps, with the resolution of the feature maps doubling and the number of feature maps decreasing with each additional layer. The process terminates at layer 650 which includes a convolution block 652 and a set of 1024×1024×16 feature maps 654. The 16 feature maps 654 may be blended to form a 1024 pixel×1024 pixel image of the 3D asset at the final resolution (not shown). In some embodiments, the resolution of the final image may be higher than or lower than the 1024 pixel×1024 pixel resolution as shown in FIG. 6.

In some embodiments, each layer that doubles the spatial resolution of feature maps include two layers of 3×3 convolution blocks. In some embodiments, as the spatial resolution of the feature maps increases, the number of convolution blocks per layer decreases and, correspondingly, the filtering operations performed on the features of the image likewise decreases.

Figure 7:
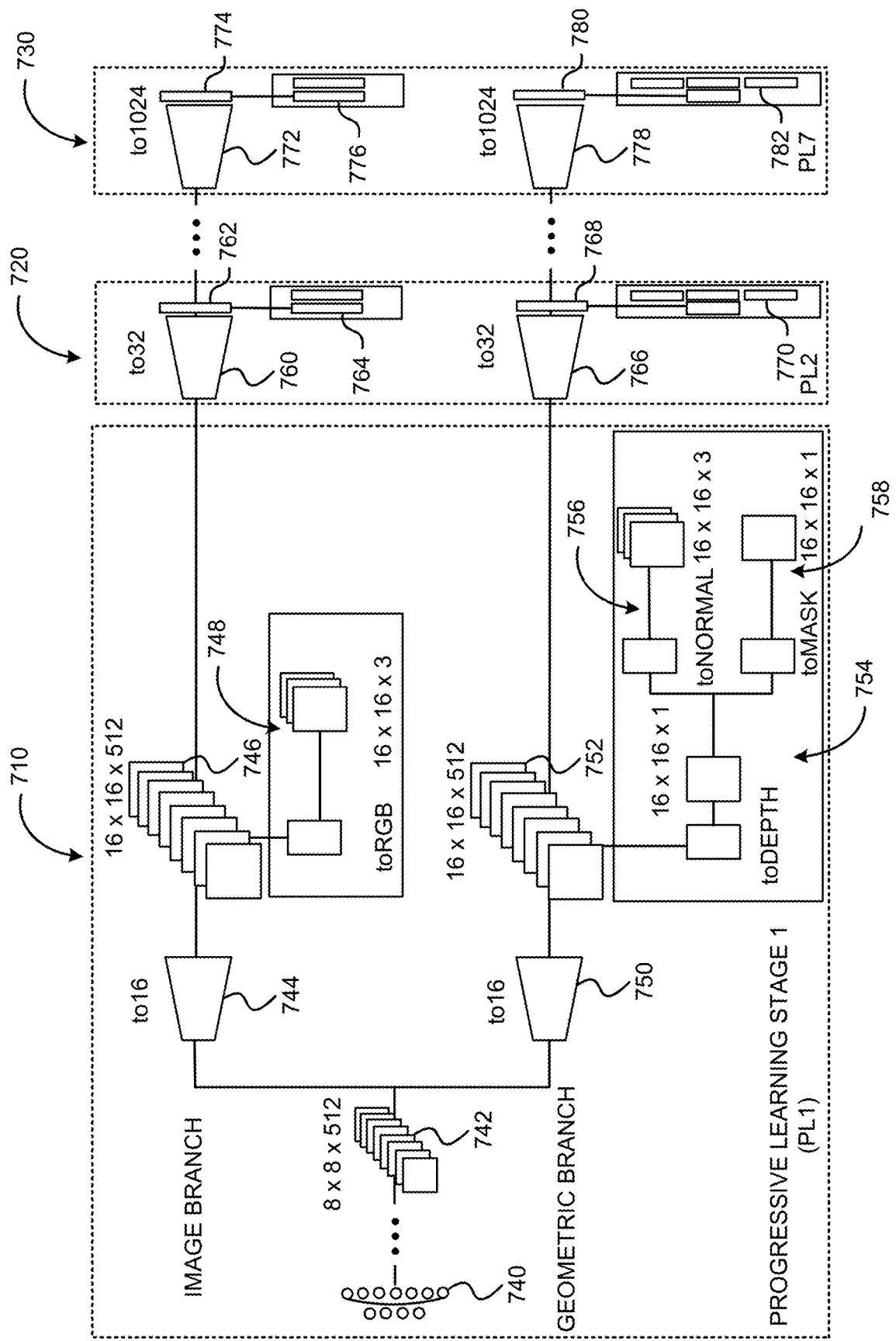
FIG. 7 illustrates a more detailed view of the machine learning model of FIG. 6, according to various embodiments.

FIG. 7 illustrates a more detailed view of the machine learning model 320 of FIG. 6, according to various embodiments. As shown, the machine learning model 320 includes a progressive learning stage 1 (PL1) 710 that generates 16×16 feature maps. The machine learning model 320 further includes a progressive learning stage 2 (PL2) 720 that generates 32×32 feature maps. The machine learning model 320 further includes additional progressive learning stages 3-6 (PL3-PL6) (not shown) that generate feature maps at increasingly higher spatial resolutions. The machine learning model 320 further includes a progressive learning stage 7 (PL7) 710 that generates feature maps at the final 1024×1024 spatial resolution.

Progressive learning stage 1 710 receives rig vector data at a fully connected block 740. The fully connected block 740 receives the rig vector data and maps the rig vector data to feature maps (not shown). The feature maps are upscaled via one or more convolution blocks (not shown) until progressive learning stage 1 710 generates feature maps 742 at a resolution of 8×8. Progressive learning stage 1 710 then splits into two branches. An image branch includes a convolution block 744 and feature maps 746 that generate albedo image data at a resolution of 16×16. An albedo mapping block 748 translates the data in feature maps 746 to RGB data at a resolution of 16×16. Similarly, a geometric branch includes a convolution block 750 and feature maps 752 that generate geometric image data at a resolution of 16×16. A depth mapping block 754 translates the data in feature maps 752 to depth data at a resolution of 16×16. A surface normal mapping block 756 derives surface normal data from the depth data generated by the depth mapping block 754 at a resolution of 16×16. Similarly, a mask mapping block 758 derives mask data from the depth data generated by the depth mapping block 754 at a resolution of 16×16. The data generated by the albedo mapping block 748, depth mapping block 754, surface normal mapping block 756, and mask mapping block 758 are employed to train progressive learning stage 1 710. After progressive learning stage 1 710 is trained, the data generated by the albedo mapping block 748, depth mapping block 754, surface normal mapping block 756, and mask mapping block 758 may be discarded.

Progressive learning stage 2 720 receives feature map data from progressive learning stage 1 710. Convolution block 760 and feature maps 762 generate albedo image data at a resolution of 32×32. An albedo mapping block 764 translates the data in feature maps 762 to RGB data at a resolution of 32×32. Similarly, convolution block 766 and feature maps 768 that generate geometric image data at a resolution of 32×32. A geometric mapping block 770 translates the data in feature maps 768 to depth data, surface normal data, and mask data at a resolution of 16×16. The data generated by the albedo mapping block 764 and geometric mapping block 770 are employed to train progressive learning stage 2 720. After progressive learning stage 2 720 is trained, the data generated by the albedo mapping block 764 and geometric mapping block 770 may be discarded. Progressive learning stages 3-6 perform similarly to progressive learning stage 1 710 and progressive learning stage 2 720, generating feature maps at higher spatial resolutions with each learning stage. Progressive learning stage 7 730 includes convolution block 772, feature maps 774, and albedo mapping block 776 to generate albedo image data at the final 1024×1024 resolution. Similarly, progressive learning stage 7 730 includes convolution block 778, feature maps 780, and geometric mapping block 782 to generate surface normal, depth, and mask image data at the final 1024×1024 resolution. Data generated by albedo mapping block 776 and geometric mapping block 782 include image data at the final resolution and, therefore, this data is not discarded.

It will be appreciated that the system shown herein is illustrative and that variations and modifications are possible. For example, the embodiments illustrated and described in conjunction with FIGS. 1-7 include a machine learning model with a particular number of layers, where each layer has a certain number of feature maps and each feature map has a certain spatial resolution. However, any machine learning model having any technically feasible number of layers, where each layer may have any number of feature maps at any resolution, is within the scope of the present disclosure.

Figure 8:
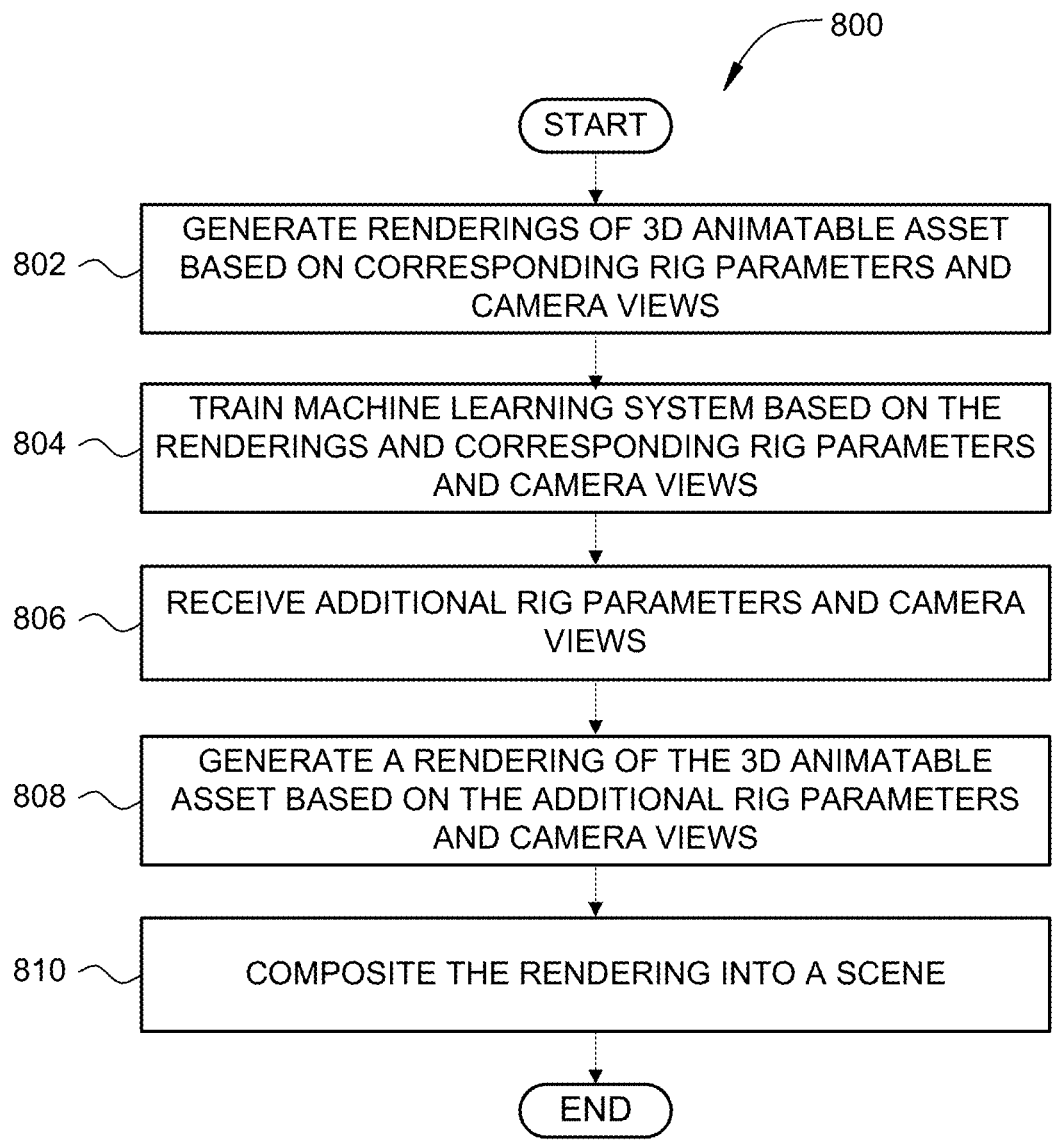
FIG. 8 is a flow diagram of method steps for rendering images for a three-dimensional (3D) animatable asset, according to various embodiments.

FIG. 8 is a flow diagram of method steps for rendering images for a three-dimensional (3D) animatable asset, according to various embodiments. Although the method steps are described in conjunction with the systems of FIGS. 1-7, persons of ordinary skill in the art will understand that any system configured to perform the method steps, in any order, is within the scope of the various embodiments.

As shown, a method 800 begins at step 802, where a rendering module 130 executing on a computer system 100 generates first image data of a 3D animatable asset based on first rig vector data. The first rig vector data includes rig parameters that position the 3D asset in a particular pose and at a particular view from a virtual camera. Rendering module generates corresponding first image data based on the rig vector data, the deformation algorithms defined for the 3D asset, and the surface geometry defined for the 3D asset. Rendering module 130 may repeat step 802 to generate image data for the 3D asset for various poses and various virtual camera views. Rendering module may then store the rig vector data and corresponding image data as a data training set.

At step 804, rendering module 130 trains a machine learning model based on the first image data and first rig vector data. In some embodiments, rendering module 130 trains the machine learning model consistent with the examples of FIG. 3. In more detail, rendering module 130 retrieves first image data and first rig vector data from the data training set. Rendering module 130 transmits the rig vector data to the machine learning model. The machine learning model generates predicted image data based on the rig vector data. A summer determines the difference between the predicted image and a ground truth image that represents the original image data from the training data set. The difference between the predicted image and a ground truth image is fed back into the machine learning model to train the machine learning model. Rendering module 130 repeats step 804 for various image data and rig vector data in the training data set in order to progressively train the machine learning model layer-by-layer as described with respect to FIG. 7.

At step 806, rendering module 130 receives second rig vector data. The second rig vector data may be received in real-time via a motion capture system, a motion controller, and/or the like. At step 808, rendering module 130 generates, via the trained machine learning model, second image data of the 3D animatable asset based on the second rig vector data. The image data of the 3D asset is generated in real-time based on the pose and view represented by the second rig vector data.

In some embodiments, the trained machine learning model generates a fully lit 3D asset based in the light model of the 3D asset when the machine learning model was trained. Image data generated in this manner may only be composited into a final composited scene that has the same light model as the 3D asset. In some embodiments, the trained machine learning model generates image data I={$I_a$, $I_n$,$I_d$,$I_m$} with separate elements for albedo, surface normal, depth, and mask data. By generating such separate elements, the rendering module 130 may more easily and accurately generate the 3D asset in a scene with dynamically changing light sources.

At step 810, rendering module 130 composites the second image data into a final composited scene. Rendering module 130 may generate dynamic lighting effects for the 3D asset by using the surface normal data and composing the surface normal data with light sources in the scene. Rendering module 130 may composite the 3D asset with other 3D assets such as 3D objects and other scene elements. When other 3D objects move in front of the 3D asset, rendering module determines which pixels of the 3D asset are to be replaced by the color from pixels of the occluding 3D object. The method 800 then terminates.

In sum, a computer system executes a rendering module that includes a machine learning model for generating images of a 3D asset directly from an animation rig created from a movie production. The rendering module generates training data for the machine learning model by deforming the animation rig via the deformation algorithms employed for the movie production. The rendering module generates rig vector data based on the deformed animation rig and a camera view of a virtual camera pointed in the direction of the 3D asset. The rendering module generates image data of the surface geometry of the 3D asset resulting from the deformation of the animation rig. The rendering module stores the rig vector data and the corresponding image data of the surface geometry. The image data includes one or more of an albedo image, a surface normal image, a depth image, and a mask image. The rendering module generates image data from rig vector data that represents a variety of poses and camera views to compose a training data set. The rendering engine then progressively trains the machine learning model layer-by-layer based on the rig vector data and the corresponding image data. The machine learning model includes a first branch for training on and generating albedo image data and a second branch for training on and generating surface normal image data, depth image data, and mask image data.

At run-time, the machine learning model receives rig vector data in real-time via a motion capture system, a rig control system, a gaming application, an XR application, and/or the like. From the received rig vector data, the machine learning model generates corresponding image data, including one or more of an albedo image, a surface normal image, a depth image, and a mask image. The rendering engine then composites the image data with other scene elements to generate a final composited scene.

At least one technical advantage of the disclosed techniques relative to the prior art is that the disclosed techniques enable a computer-based machine learning model to generate image data directly from an animation rig in real-time. Because the training image data for the machine learning model is based on the original animation rig, deformation algorithms, and surface geometry, lower quality rendering assets do not need to be generated while at the same time the real-time image data generated by the machine learning model is more realistic and true to the original 3D asset relative to prior real-time rendering techniques. Another technical advantage of the disclosed techniques is that, because surface normal image data, depth image data, and mask image data are generated via a single combined branch of the machine learning model, the machine learning model is smaller and more efficient than machine learning models that process such image data via three separate branches. As a result, the machine learning model consumes less computer resources relative to prior approaches. These technical advantages represent one or more technological advancements over prior art approaches.

1. In some embodiments, a computer-implemented method for generating image data of a three-dimensional (3D) animatable asset comprises: accessing a machine learning model that has been trained via first image data of the 3D animatable asset generated from first rig vector data; receiving second rig vector data; and generating, via the machine learning model, a second image data of the 3D animatable asset based on the second rig vector data.

2. The computer-implemented method according to clause 1, wherein the second rig vector data includes positional x, y, z data.

3. The computer-implemented method according to clause 1 or clause 2, wherein the second rig vector data includes at least one of position data or orientation data.

4. The computer-implemented method according to any of clauses 1-3, wherein the second image data includes at least one of albedo image data, surface normal image data, depth image data, or mask image data.

5. The computer-implemented method according to any of clauses 1-4, wherein the machine learning model includes a plurality of layers, and wherein the machine learning model has been trained by: training a first layer included in the plurality of layers; and subsequent to training the first layer, training a second layer included in the plurality of layers that receives an input from the first layer.

6. The computer-implemented method according to any of clauses 1-5, wherein the second layer includes a convolution block that doubles a spatial resolution of the first layer.

7. The computer-implemented method according to any of clauses 1-6, wherein a first branch of the machine learning model generates albedo image data, and wherein a second branch of the machine learning model generates surface normal image data, depth image data, and mask image data.

8. The computer-implemented method according to any of clauses 1-7, wherein at least one of the surface normal image data and the mask image data is derived from the depth image data.

9. The computer-implemented method according to any of clauses 1-8, further comprising compositing the second image data with image data associated with one or more additional 3D animatable objects to generate a composited scene.

10. The computer-implemented method according to any of clauses 1-9, wherein the second image data includes surface normal image data, and wherein compositing the second image data with image data associated with one or more additional 3D animatable objects comprises applying a light model to the 3D animatable asset based on the surface normal image data.

11. The computer-implemented method according to any of clauses 1-10, wherein the second image data includes first albedo image data and first depth image data, and wherein compositing the second image data with image data associated with one or more additional 3D animatable objects comprises: determining a difference between the first depth image data with second depth image data associated with a second 3D animatable object included in the one or more additional 3D animatable objects; and displaying at least one of the first albedo image data and second albedo image data associated with the second 3D animatable object based on the difference.

12. In some embodiments, one or more non-transitory computer-readable storage media include instructions that, when executed by one or more processors, cause the one or more processors to perform the steps of: accessing a machine learning model that has been trained via first image data of the 3D animatable asset generated from first rig vector data; receiving second rig vector data; and generating, via the machine learning model, a second image data of the 3D animatable asset based on the second rig vector data.

13. The one or more non-transitory computer-readable storage media according to clause 12, wherein the second rig vector data includes positional x, y, z data.

14. The one or more non-transitory computer-readable storage media according to clause 12 or clause 13, wherein the second rig vector data includes at least one of position data or orientation data.

15. The one or more non-transitory computer-readable storage media according to any of clauses 12-14, wherein the second image data includes at least one of albedo image data, surface normal image data, depth image data, or mask image data.

16. The one or more non-transitory computer-readable storage media according to any of clauses 12-15, wherein the machine learning model includes a plurality of layers, and wherein the machine learning model has been trained by: training a first layer included in the plurality of layers; and subsequent to training the first layer, training a second layer included in the plurality of layers that receives an input from the first layer.

17. The one or more non-transitory computer-readable storage media according to any of clauses 12-16, wherein the second layer includes a convolution block that doubles a spatial resolution of the first layer.

18. The one or more non-transitory computer-readable storage media according to any of clauses 12-17, wherein a first branch of the machine learning model generates albedo image data, and wherein a second branch of the machine learning model generates surface normal image data, depth image data, and mask image data.

19. The one or more non-transitory computer-readable storage media according to any of clauses 12-18, wherein at least one of the surface normal image data and the mask image data is derived from the depth image data.

20. In some embodiments, a system comprises: a memory that includes instructions; and a processor that is coupled to the memory and, when executing the instructions: accesses a machine learning model that has been trained via first image data of the 3D animatable asset generated from first rig vector data; receives second rig vector data; and generates, via the machine learning model, a second image data of the 3D animatable asset based on the second rig vector data.

Any and all combinations of any of the claim elements recited in any of the claims and/or any elements described in this application, in any fashion, fall within the contemplated scope of the various embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating image data of a scene including a three-dimensional (3D) animatable asset, the method comprising:
accessing a machine learning model that has been trained via first image data of the 3D animatable asset generated by rendering movements of the 3D animatable asset based on first rig vector data that is associated with a plurality of poses of an animation rig usable to deform the 3D animatable asset via a plurality of control points included in the animation rig, wherein at least one of the movements of the 3D animatable asset is rendered from a plurality of virtual camera views;
receiving second rig vector data that includes a plurality of rig parameter values associated with the plurality of control points included in the animation rig; and
generating, via the machine learning model, second image data of the 3D animatable asset based on the second rig vector data, wherein generating the second image data comprises inputting a one-dimensional (1D) array of the plurality of rig parameter values included in the second rig vector data into the machine learning model that outputs the second image data.

2. The computer-implemented method of claim 1, wherein the second rig vector data includes positional x, y, z data.

3. The computer-implemented method of claim 1, wherein the second rig vector data includes at least one of position data or orientation data.

4. The computer-implemented method of claim 1, wherein the second image data includes at least one of albedo image data, surface normal image data, depth image data, or mask image data.

5. The computer-implemented method of claim 1, wherein the machine learning model includes a plurality of layers, and wherein the machine learning model has been trained by:
training a first layer included in the plurality of layers; and
subsequent to training the first layer, training a second layer included in the plurality of layers that receives an input from the first layer.

6. The computer-implemented method of claim 5, wherein the second layer includes a convolution block that doubles a spatial resolution of the first layer.

7. The computer-implemented method of claim 1, wherein a first branch of the machine learning model generates albedo image data, and wherein a second branch of the machine learning model generates surface normal image data, depth image data, and mask image data.

8. The computer-implemented method of claim 7, wherein at least one of the surface normal image data or the mask image data is derived from the depth image data.

9. The computer-implemented method of claim 1, further comprising compositing the second image data with image data associated with one or more additional 3D animatable assets to generate a composited scene.

10. The computer-implemented method of claim 9, wherein the second image data includes surface normal image data, and wherein compositing the second image data with the image data associated with the one or more additional 3D animatable assets comprises applying a light model to the 3D animatable asset based on the surface normal image data.

11. The computer-implemented method of claim 1, wherein
the second rig vector data includes at least one of a virtual camera position or a virtual camera orientation.

12. A computer-implemented method for generating image data of a scene including a three-dimensional (3D) animatable asset, the method comprising:
accessing a machine learning model that has been trained via first image data of the 3D animatable asset generated by rendering movements of the 3D animatable asset based on first rig vector data that is associated with a plurality of rig poses, wherein at least one of the movements of the 3D animatable asset is rendered from a plurality of virtual camera views;
receiving second rig vector data that includes a plurality of rig parameter values;
generating, via the machine learning model, second image data of the 3D animatable asset based on the second rig vector data, wherein generating the second image data comprises inputting the plurality of rig parameter values included in the second rig vector data into the machine learning model; and
compositing the second image data with image data associated with one or more additional 3D animatable assets to generate a composited scene,
wherein the second image data includes first albedo image data and first depth image data, and wherein compositing the second image data with the image data associated with
the one or more additional 3D animatable assets comprises:
determining a difference between the first depth image data with second depth image data associated with a second 3D animatable asset included in the one or more additional 3D animatable assets; and
displaying at least one of the first albedo image data or the second albedo image data associated with the second 3D animatable asset based on the difference.

13. One or more non-transitory computer-readable storage media including instructions that, when executed by one or more processors, cause the one or more processors to perform the steps of:
accessing a machine learning model that has been trained via first image data of a 3D animatable asset generated by rendering movements of the 3D animatable asset based on first rig vector data that is associated with a plurality of poses of an animation rig usable to deform the 3D animatable asset via a plurality of control points included in the animation rig, wherein at least one of the movements of the 3D animatable asset is rendered from a plurality of virtual camera views;
receiving second rig vector data that includes a plurality of rig parameter values associated with the plurality of control points included in the animation rig; and
generating, via the machine learning model, second image data of the 3D animatable asset based on the second rig vector data, wherein generating the second image data comprises inputting a one-dimensional (1D) array of the plurality of rig parameter values included in the second rig vector data into the machine learning model that outputs the second image data.

14. The one or more non-transitory computer-readable storage media of claim 13, wherein the second rig vector data includes positional x, y, z data.

15. The one or more non-transitory computer-readable storage media of claim 13, wherein the second rig vector data includes at least one of position data or orientation data.

16. The one or more non-transitory computer-readable storage media of claim 13, wherein the second image data includes at least one of albedo image data, surface normal image data, depth image data, or mask image data.

17. The one or more non-transitory computer-readable storage media of claim 13, wherein the machine learning model includes a plurality of layers, and wherein the machine learning model has been trained by:
training a first layer included in the plurality of layers; and
subsequent to training the first layer, training a second layer included in the plurality of layers that receives an input from the first layer.

18. The one or more non-transitory computer-readable storage media of claim 17, wherein the second layer includes a convolution block that doubles a spatial resolution of the first layer.

19. The one or more non-transitory computer-readable storage media of claim 13, wherein a first branch of the machine learning model generates albedo image data, and wherein a second branch of the machine learning model generates surface normal image data, depth image data, and mask image data.

20. The one or more non-transitory computer-readable storage media of claim 19, wherein at least one of the surface normal image data or the mask image data is derived from the depth image data.

21. A system, comprising:
a memory that includes instructions; and
a processor that is coupled to the memory and, when executing the instructions:
accesses a machine learning model that has been trained via first image data of a 3D animatable asset generated by rendering movements of the 3D animatable asset based on first rig vector data that is associated with a plurality of poses of an animation rig usable to deform the 3D animatable asset via a plurality of control points included in the animation rig, wherein at least one of the movements of the 3D animatable asset is rendered from a plurality of virtual camera views,
receives second rig vector data that includes a plurality of rig parameter values associated with the plurality of control points included in the animation rig, and
generates, via the machine learning model, second image data of the 3D animatable asset based on the second rig vector data, wherein generating the second image data comprises inputting a one-dimensional (1D) array representation of the plurality of rig parameter values included in the second rig vector data into the machine learning model that outputs the second image data.

* * * * *

UNITED STATES PATENT AND TRADEMARK OFFICE
CERTIFICATE OF CORRECTION

| | |
|---|---|
| PATENT NO. | : 11,995,749 B2 |
| APPLICATION NO. | : 16/810792 |
| DATED | : May 28, 2024 |
| INVENTOR(S) | : Dominik Borer et al. |

It is certified that error appears in the above-identified patent and that said Letters Patent is hereby corrected as shown below:

In the Claims

In Column 20, Line 44, in Claim 21, delete "representation of" and insert -- of --.

Signed and Sealed this
Nineteenth Day of November, 2024

Katherine Kelly Vidal
*Director of the United States Patent and Trademark Office*